United States Patent [19]

Merchlewitz

[11] Patent Number: 4,933,569
[45] Date of Patent: Jun. 12, 1990

[54] SHUT-OFF VALVE FOR SPRAYER
[75] Inventor: Anthony W. Merchlewitz, Faribault, Minn.
[73] Assignee: H. D. Hudson Manufacturing Co., Chicago, Ill.
[21] Appl. No.: 220,797
[22] Filed: Jul. 18, 1988
[51] Int. Cl.$^5$ ............................................. F16K 39/04
[52] U.S. Cl. ..................................... 251/282; 251/325
[58] Field of Search ................................. 251/282, 325
[56] References Cited

U.S. PATENT DOCUMENTS

| | | | |
|---|---|---|---|
| 1,259,298 | 3/1918 | Scheid | 251/325 X |
| 2,307,949 | 1/1943 | Phillips | 251/282 X |
| 2,485,192 | 10/1949 | Eickstaedt | 251/282 X |
| 2,939,675 | 6/1960 | Karden | 251/325 X |
| 3,140,830 | 7/1964 | Ingold | 251/282 X |
| 3,294,362 | 12/1966 | Schultz et al. | 251/282 X |
| 3,419,197 | 12/1968 | Battaglia | 251/325 X |
| 4,027,851 | 6/1977 | Schlotman | 251/282 X |
| 4,106,750 | 8/1978 | Karden et al. | 251/282 |
| 4,764,047 | 8/1988 | Johnston et al. | 251/325 X |

FOREIGN PATENT DOCUMENTS 2130344  5/1984  United Kingdom ............... 251/325

Primary Examiner—John Rivell
Attorney, Agent, or Firm—Kane, Dalsimer, Sullivan, Kurucz, Levy, Eisele & Richard

[57] ABSTRACT

The present invention relates to a valve with a reciprocating piston between two oppositely-acting fluid balance chambers. The static and dynamic pressures of the fluid being dispensed creates a force in each balance chamber. However, these force vectors are of equal magnitude but opposite direction thereby resulting in no net force on the piston. This allows for the elimination of a spring compensating for fluid pressures on the piston. An internal flow passage is used within the piston so as to simplify the design and increase reliability.

12 Claims, 3 Drawing Sheets

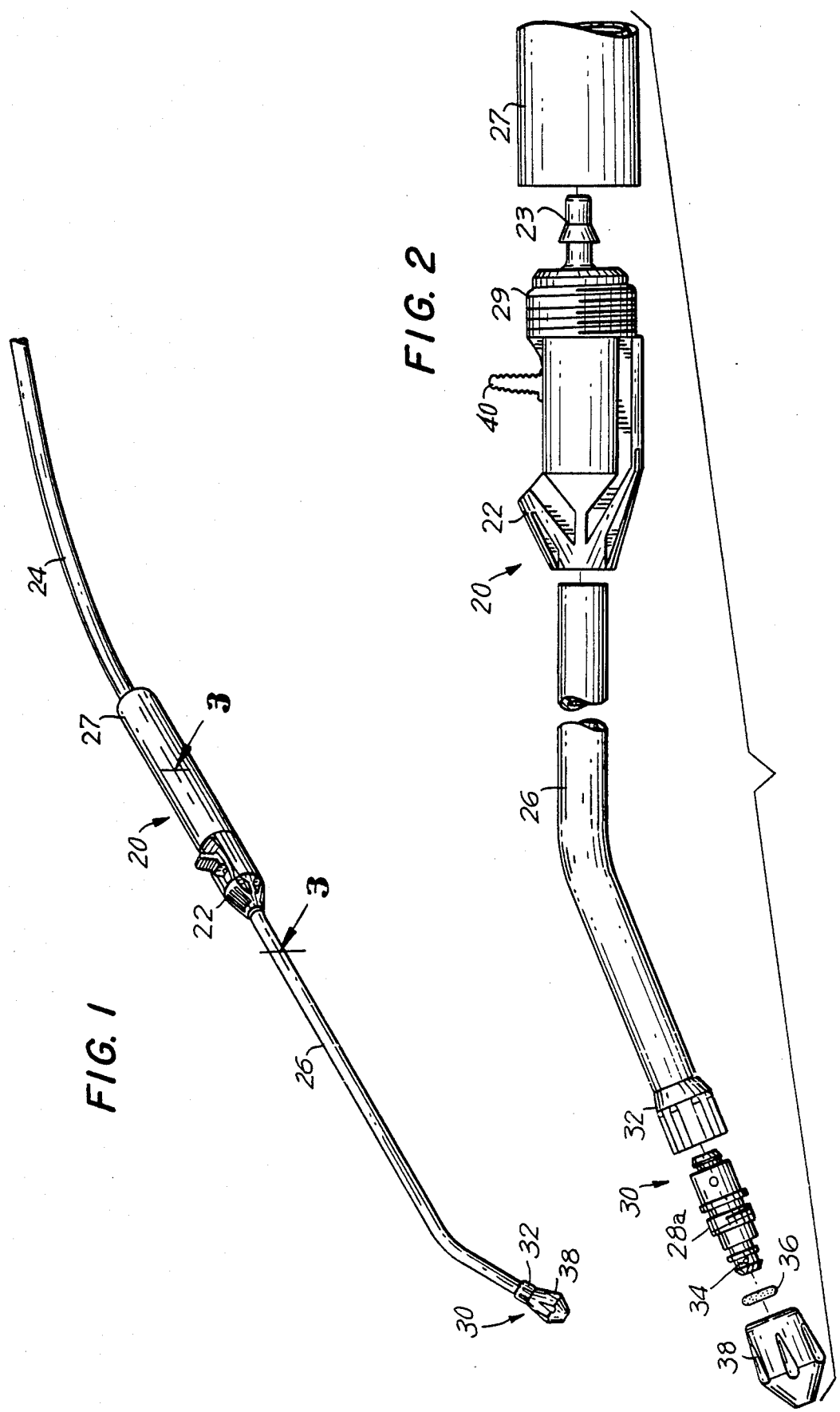

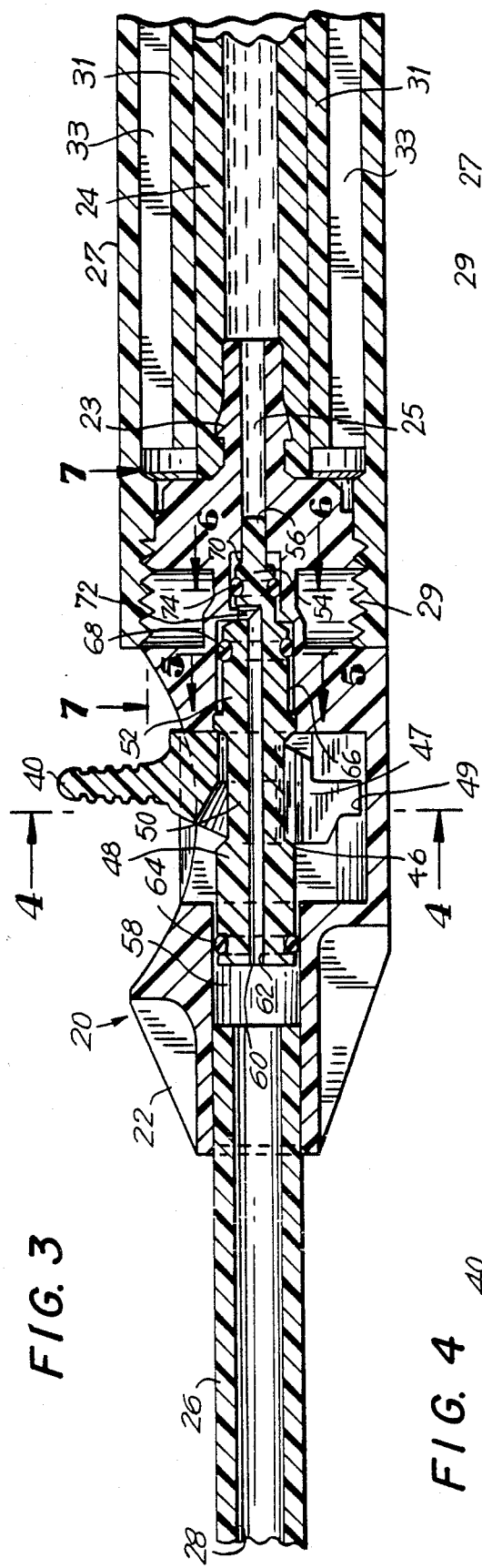
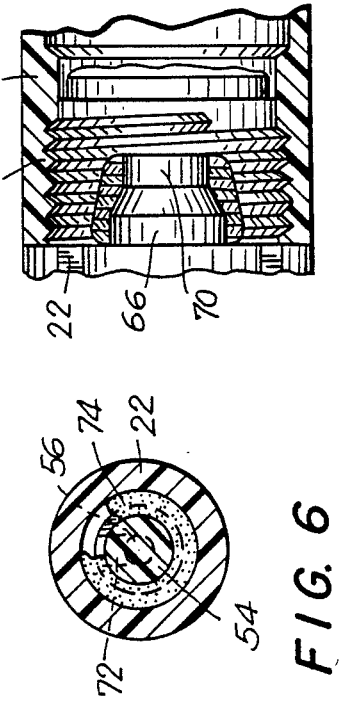
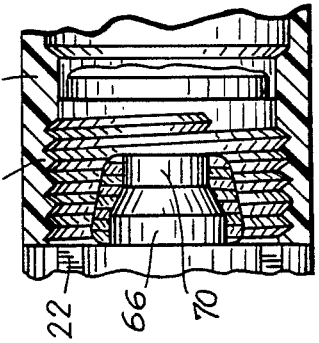
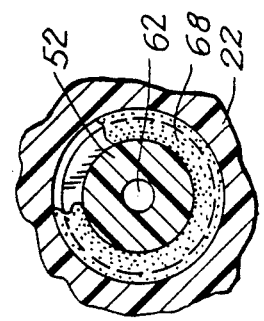
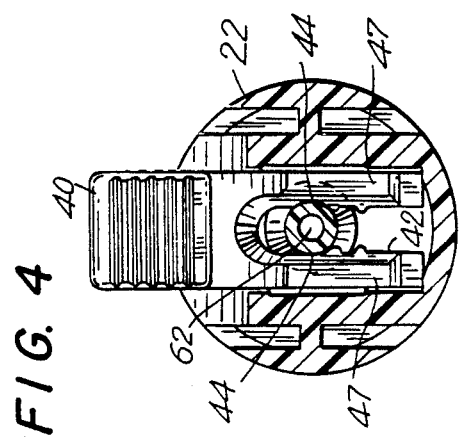

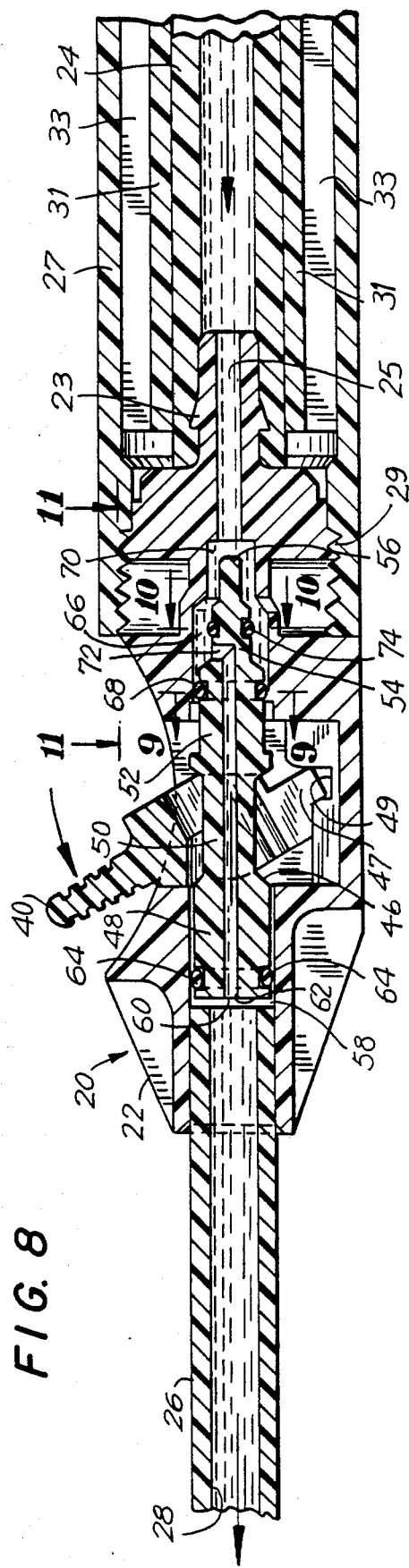
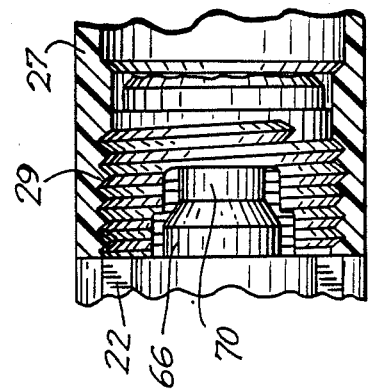
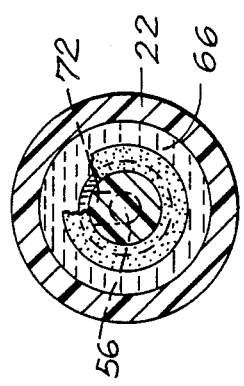
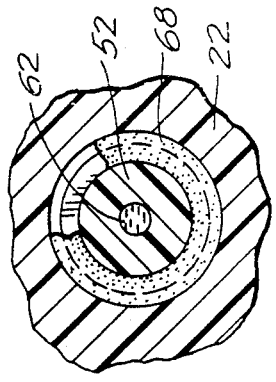

SHUT-OFF VALVE FOR SPRAYER

BACKGROUND OF THE INVENTION

1. Field of Invention

This invention relates to a shut-off valve for a garden sprayer, including oppositely acting fluid chambers and an internal flow passage within the piston.

2. Description of the Prior Art

In the prior art, hand-controlled shut-off valves for garden sprayers and similar apparatus had to compensate for the static and dynamic pressure components exerted by the pressurized fluid controlled thereby. In particular, depending upon the design of the valve, the static force of the pressurized liquid could force the valve from a closed to an open position. This is particularly true in a "push forward on, and pull back off" design. Conversely, the dynamic pressure of the moving liquid could force the valve closed, less open, or more open from a fully or partially open position. The typical solution to this problem was to bias the valve with a spring. However, this added complications in that the Hooke's constant spring must be matched to the static and dynamic pressures of the fluid, the Hooke's constant characteristics of the spring can change over time and with respect to use and exposure. Further, the spring is typically exposed to corrosive chemicals within the pressurized fluid. Any resulting failure in the spring results at least in degraded or inconvenient performance, if not a total failure in function.

Additionally, if a valve in the prior art had a fluid path traversing several interfaces of components of the valve, the valve became susceptible to external leakage and failure.

OBJECTS AND SUMMARY OF INVENTION

It is therefore an object of this invention to provide a valve for garden sprayers and similar apparatus which has an operation which is not susceptible to the static and dynamic pressures of the fluid being dispensed.

It is therefore a further object of this invention to provide a valve for garden sprayers and similar apparatus which does not use a spring or have a requirement for metal parts which are susceptible to corrosion.

It is therefore a further object of this invention to provide a valve which has a reduced susceptibility to external leakage.

It is a further object of this invention to provide a valve for garden prayers and similar apparatus which is simple to manufacture, and reliable to use.

The present invention is a valve for garden sprayers and similar apparatus which includes a reciprocating piston with oppositely-acting balanced fluid chambers on both axial ends thereof. Further, the valve design has a "push forward on and pull back off" configuration. When the piston is pushed forward to open the valve, the fluid being dispensed fills both oppositely-acting balanced fluid chambers thereby exerting fluid pressure induced axial force vectors of equal magnitude but opposite direction upon the reciprocating piston. As these oppositely directed fluid pressure induced axial force vectors cancel each other, there is not net force upon the valve piston due to static or dynamic fluid pressures while fluid is being dispensed through the valve. Therefore, the need for a spring compensating for such pressures is eliminated.

The valve is designed such that the dispensed fluid passes through an internal flow passage along the longitudinal axis of the reciprocating piston. The total flow passage of the valve is included within the body of the valve and the internal flow passage of the reciprocating piston. This results in a simple design with a minimum of component interfaces within the flow passage thereby decreasing the valve's susceptibility to external leakage.

BRIEF DESCRIPTION OF THE DRAWINGS

Further objects and advantages of the invention will become apparent from the following description and claims, and from the accompanying drawings, wherein:

FIG. 1 is a side view in perspective of the present invention.

FIG. 2 is a side view, partly exploded, partly in elevation of the present invention.

FIG. 3 is a cross-sectional view taken along section 3—3 of FIG. 1, showing the valve of the present invention in a closed position.

FIG. 4 is a transverse cross-sectional view along section 4—4 of FIG. 3.

FIG. 5 is a transverse cross-sectional view along section 5—5 of FIG. 3.

FIG. 6 is a transverse cross-sectional view along section 6—6 of FIG. 3.

FIG. 7 is a side view, partly in elevation, of section 7—7 of FIG. 3.

FIG. 8 is a cross-sectional view similar to FIG. 3 of the present invention, showing the valve in an open position.

FIG. 9 is a transverse cross-sectional view along section 9—9 of FIG. 8.

FIG. 10 is a transverse cross-sectional view along section 10—10 of FIG. 8.

FIG. 11 is a side view, partly in elevation of section 11—11 of FIG. 8.

DETAILED DESCRIPTION OF THE PREFERRED EMBODIMENT

Referring now to the drawings in detail wherein like numerals indicate like elements throughout the several views, the apparatus 20 of the present invention includes a main valve body 22 with an input hose 24 engaging a protruding male stem 23 with an axial flow passage 25 therein on the distal end of valve body 22 and an output tube 26 force-fit to its proximal end as shown in FIG. 3. A hollow cylindrical handle section 27 is threadably engaged on to a male threaded section 29 of the main valve body 22. Handle section 27 includes a concentric guide section 31 to firmly engage input hose 24 and acts as a hose clamp to seal hose 24 to male stem 23. Web sections 33 support guide section 31 within handle section 27. The input hose 24 is typically flexible and provides a feed from a pressurized or gravity-fed container (not shown) to the main valve body 22. The output tube 26 is rigid with an axial flow passage 28 (see FIG. 3) leading from the main valve body 22 to an adjustable sprayer head 30. The adjustable sprayer head 30 typically includes an enlarged female section 32 integral or force-fit onto output tube 26; an internal male threaded section 28a with an axial fluid flow passage (not shown), side fluid exit ports 34 communicating with passage 28, and a gasket 36; and an rotationally adjustable housing 38 threadably attached to male section 28a. Housing 38 further includes an orifice (not shown) at the tip thereof through which the dispensed liquid is ultimately sprayed within a spherical angle determined by the rotational and axial position of housing 38 with respect to male section 28a.

Apparatus 20 further includes switch 40 which is pivotally mounted in main valve body 22. Switch 40 may include pads (not shown) to effect a friction fit with body 22. Switch 40 includes a downwardly facing U-shaped notch 42 with detent elements 44 for mechanically engaging reciprocating piston 46. The tongs 47 of U-shaped notch 42 pivotally engage groove 49 of main valve body 22.

Piston 46 sequentially includes a forward portion 48, an intermediate portion 50, a rear portion 52, a side port portion 54 and a plug portion 56.

Forward portion 48 reciprocates within the forward fluid balance chamber 58. The forward orifice 60 of axial flow passage 62 is in the proximal end of forward portion 48. Gasket 64 maintains the seal between forward fluid balance chamber 58 and the environment.

The intermediate portion 50 of piston 46 is engaged by the detent elements 44 of switch 40. Axial flow passage 62 passes through the intermediate portion 50.

Rear portion 52 reciprocates within the rear fluid balance chamber 66. Axial flow passage 62 passes through the rear portion 52. Gasket 68 maintains the seal between rear fluid balance chamber 66 and the environment.

Plug portion 56 has a function of reducing the fluid pressure applied to piston 46 thereby reducing the opening force when piston 46 is in a closed position.

Side port portion 54 of piston 46 reciprocates between rear fluid balance chamber 66 and fluid entry chamber 70. When switch 40 is in its open position, side port portion 54 is in the rear fluid balance chamber 66 thereby allowing fluid to enter the axial flow passage 62 through side ports 72 as shown in FIG. 8. However, when switch 40 is in its closed position, plug portion 56 of piston 46 is firmly engaged by surfaces defining passage 23 thereby blocking passage 23 and entry chamber 70 as shown in FIG. 3. Gasket 74 assures a reliable blockage of side port 72 when valve 40 is in its closed position.

To use this apparatus 20, a user provides a pressurized or gravity fed source of liquid (not shown) to output hose 26. The switch 40 should initially be in its closed position as shown in FIG. 3. The user then pushes switch 40 forward as shown in FIG. 8. Fluid flows from the input hose 24 through passage 25 in stem 23, into fluid entry chamber 70 and rear fluid balance chamber 66, through side ports 72 and axial flow passage 62, out forward orifice 60, into forward balance chamber 58, through output tube 26, and through sprayer head 30 to its destination. The user may rotationally adjust housing 38 of sprayer head 30 to adjust the spherical angle of flow of the liquid.

The static and dynamic pressure induced force vectors on piston 46 generated in forward balance chambers 48 and rear balance chamber 66 are of equal magnitude therefore resulting in no net force upon piston 46.

Thus the aforementioned objectives are effectively obtained.

What is claimed is:

1. A springless valve comprising:
    a forward fluid balance chamber;
    a rear fluid balance chamber;
    a piston reciprocating within said forward fluid balance chamber and said rear fluid balance chamber between a closed position and an open position; and a flow passage within said piston communicating between said forward fluid balance chamber and said rear fluid balance chamber whereby when the valve is reciprocated to an open position the fluid being dispensed fills and passes through both chambers thereby exerting fluid pressure induced vectors of substantially equal magnitude but in opposite direction upon the reciprocation of the piston so that no net force acts upon the piston due to static or dynamic pressures while fluid is being dispensed through the valve.

2. The valve of claim 1 further including a switch means for urging said piston between an open position and a closed position.

3. The valve of claim 2 wherein said flow passage includes at least a portion substantially along a longitudinal axis of said piston.

4. The valve of claim 3 wherein said forward fluid balance chamber and said rear fluid balance chambers are of substantially equal cross section perpendicular to said longitudinal axis.

5. A valve comprising:
    a forward fluid balance chamber;
    a rear fluid balance chamber;
    a piston reciprocating within said forward fluid balance chamber and said rear fluid balance chamber;
    a switch means for urging said piston between an open position and a closed position;
    a flow passage within said piston communicating between said forward fluid balance chamber and said rear fluid balance chamber, said flow passage including at least a portion substantially along a longitudinal axis of said piston, said forward fluid balance chamber and said rear fluid balance chamber being of substantially equal cross section perpendicular to said longitudinal axis;
    an entry chamber distal to said rear fluid balance chamber, wherein said entry chamber is of a smaller cross section than said rear fluid balance chamber;
    wherein said piston further includes a port section of cross section substantially equal to that of said entry chamber; and
    wherein said flow passage includes at least one port extending from a surface of said port section.

6. The valve of claim 5 wherein said at least one port is substantially perpendicular to said longitudinal axis of said piston.

7. The valve of claim 5 wherein said portion section fits into said entry chamber so as to block said entry chamber when said piston is in said closed position and wherein said port section is moved into said rear fluid balance chamber thereby allowing communication between said entry chamber and said rear fluid balance chamber when piston is in said open position.

8. The valve of claim 6 further including an input line distal to said entry chamber, and a plug portion distal to said port portion, said plug portion being of a cross section equal to that of the input line, said plug portion blocking said input line when said piston is in said closed position.

9. The valve of claim 8 wherein said input line is of smaller cross section than said entry chamber.

10. The valve of claim 9 wherein no spring acts upon said piston.

11. The valve of claim 5 wherein said valve has a main valve body and said switch means includes a member with two tongs forming a downwardly pointed U-shaped detently engaging said piston therebetween, said tongs engaging a groove within said main valve body and pivoting therein.

12. A springless valve comprising piston means operating between two oppositely acting balance means between a closed position and an open position wherein static and dynamic pressures of a fluid being dispensed by the valve create an equal but opposite force in each balance means thereby resulting in no net force on said piston during operation whereby when the valve is reciprocated to an open position, the fluid being dispensed fills and passes through the balance means thereby exerting fluid pressure induced vectors of substantially equal magnitude but in opposite direction upon the operation of the piston.

* * * * *